(12) United States Patent
Tsuji et al.

(10) Patent No.: US 9,493,664 B2
(45) Date of Patent: Nov. 15, 2016

(54) INK JET RECORDING METHOD

(71) Applicant: CANON KABUSHIKI KAISHA, Tokyo (JP)

(72) Inventors: Itaru Tsuji, Kawasaki (JP); Yuki Nishino, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 55 days.

(21) Appl. No.: 14/564,266

(22) Filed: Dec. 9, 2014

(65) Prior Publication Data

US 2015/0184009 A1 Jul. 2, 2015

(30) Foreign Application Priority Data

Dec. 27, 2013 (JP) ................. 2013-272240

(51) Int. Cl.
| | |
|---|---|
| *C09D 11/322* | (2014.01) |
| *C09D 11/40* | (2014.01) |
| *C08K 5/5317* | (2006.01) |
| *C08K 5/42* | (2006.01) |
| *C08K 5/09* | (2006.01) |

(52) U.S. Cl.
CPC ............... *C09D 11/322* (2013.01); *C08K 5/09* (2013.01); *C08K 5/42* (2013.01); *C08K 5/5317* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 7,208,033 B2 | 4/2007 | Kawabe et al. | |
| 7,244,299 B2 | 7/2007 | Tsuji et al. | |
| 7,291,214 B2 | 11/2007 | Tsuji et al. | |
| 7,297,203 B2 | 11/2007 | Takada et al. | |
| 7,445,666 B2 | 11/2008 | Yanagimachi et al. | |
| 7,637,603 B2 | 12/2009 | Kawabe et al. | |
| 7,868,060 B2 | 1/2011 | Sakai et al. | |
| 8,016,932 B2 | 9/2011 | Okamura et al. | |
| 2007/0100024 A1 | 5/2007 | Gu et al. | |
| 2011/0096132 A1* | 4/2011 | Kobayashi | B41J 2/2146 347/102 |
| 2013/0027476 A1* | 1/2013 | Mori | C09D 11/322 347/56 |

FOREIGN PATENT DOCUMENTS

| | | |
|---|---|---|
| JP | 2001-081378 A | 3/2001 |
| JP | 2009-515007 A | 4/2009 |

\* cited by examiner

*Primary Examiner* — Laura C Powers
(74) *Attorney, Agent, or Firm* — Fitzpatrick, Cella, Harper & Scinto

(57) ABSTRACT

An ink jet recording method including recording a secondary color image on a recording medium using a first ink and a second ink, wherein the first ink contains a first self-dispersible pigment having a functional group that contains a phosphonic acid group and is bonded to a particle surface of the pigment, the second ink contains a second self-dispersible pigment having a functional group that contains at least one acidic group of a sulfonic acid group and a carboxylic acid group and is bonded to a particle surface of the pigment. The method includes a step of overlappingly applying the first ink and the second ink in this order to the recording medium. The time difference between applications of the first ink and the second ink to the recording medium is 30 milliseconds or less.

15 Claims, No Drawings

INK JET RECORDING METHOD

BACKGROUND OF THE INVENTION

Field of the Invention

The present invention relates to an ink jet recording method.

Description of the Related Art

According to an ink jet recording method, an image can be recorded (formed) on various recording media. Various inks corresponding to purposes, for example, an ink suitable for recording an image of photographic image quality on glossy paper and an ink suitable for recording a document on plain paper, have been proposed to intend better image formation. In recent years, the ink jet recording method has been utilized even in printing of a business document including characters and figures using plain paper as a recording medium, thereby increasing the frequency of its use dramatically. Therefore, as an ink suitable for recording characters and figures on a recording medium such as plain paper, an ink using a self-dispersible pigment as a coloring material increases.

A great number of inks containing the self-dispersible pigment have been proposed to date. For example, there is a proposal for improving the performance of an image recorded on plain paper by using an ink containing a self-dispersible pigment, which can be stably dispersed without using a dispersant, and a specific salt (Japanese Patent Application Laid-Open No. 2001-081378). In addition, there is also a proposal for improving an optical density of an image recorded by using an ink containing a self-dispersible pigment to which a functional group high in reactivity to calcium has been bonded on the basis of a calcium index which is an index of reactivity to calcium (Japanese translation of PCT Application Publication No. 2009-515007).

SUMMARY OF THE INVENTION

While referring to the above prior art documents, the present inventors have carried out an investigation by recording an image with a combination of a plurality of inks containing the self-dispersible pigment. As a result, it has been found that the color developability of primary color images recorded by respectively using inks prepared according to the methods proposed in Japanese Patent Application Laid-Open No. 2001-081378 and Japanese translation of PCT Application Publication No. 2009-515007 by themselves are both at a satisfactory level. The present inventors have then recorded a secondary color image with a plurality of inks containing the self-dispersible pigment by means of an ink jet recording apparatus capable of recording at a high speed on a greater number of recording media in a short period of time. As a result, it has been found that the secondary color image recorded does not uniformly color, and so an image sufficient in uniformity (coloring uniformity) cannot be recorded.

Accordingly, it is an object of the present invention to provide an ink jet recording method capable of recording an image excellent in uniformity.

The above object is achieved by the following present invention. According to the present invention, there is thus provided an ink jet recording method including recording a secondary color image on a recording medium using a first ink and a second ink, wherein the first ink contains a first self-dispersible pigment having a functional group that contains a phosphonic acid group and is bonded to a particle surface of the pigment, the second ink contains a second self-dispersible pigment having a functional group that contains at least one acidic group of a sulfonic acid group and a carboxylic acid group and is bonded to a particle surface of the pigment, the method includes a step of overlappingly applying the first ink and the second ink in this order to the recording medium, and a time difference between applications of the first ink and the second ink to the recording medium is 30 milliseconds or less.

According to the present invention, there can be provided an ink jet recording method capable of recording an image excellent in uniformity.

Further features of the present invention will become apparent from the following description of exemplary embodiments.

DESCRIPTION OF THE EMBODIMENTS

The present invention will now be described in detail by preferred embodiments. However, the present invention is not limited to the following embodiments. As a result of the investigations by the present inventors, it has been found that when an ink containing a self-dispersible pigment is used alone, an image having sufficient color developability can be recorded. However, when a secondary color image is recorded in a short period of time with a plurality of inks containing a self-dispersible pigment, the uniformity of the secondary color image may become insufficient in some cases. More specifically, when a time difference between applications of a first ink droplet and a second ink droplet is as short as 5 to 30 milliseconds, the uniformity of the secondary color image becomes insufficient. On the other hand, when the time difference is prolonged to 35 milliseconds or so, the uniformity of the image is improved. However, another problem that a recording speed becomes slow is caused.

Thus, the present inventors have carried out an investigation with a view toward improving the uniformity of the secondary color image under a state where the time difference between the applications of the two inks to the recording medium is kept short to increase the recording speed. As a result, an ink jet recording method capable of obtaining an image having excellent uniformity even when the recording is conducted with plural inks in a short period of time has been found. That is, the ink jet recording method according to the present invention is an ink jet recording method of recording a secondary color image on a recording medium with a first ink and a second ink, said method having a step of overlappingly applying the first ink and the second ink in this order to the recording medium. The first ink contains a first self-dispersible pigment having a functional group that contains a phosphonic acid group and is bonded to a particle surface of the pigment, and the second ink contains a second self-dispersible pigment having a functional group that contains at least one acidic group of a sulfonic acid group and a carboxylic acid group and is bonded to a particle surface of the pigment. The time difference between applications of the first ink and the second ink to the recording medium is 30 milliseconds or less. Hereinafter, the self-dispersible pigment having a functional group that contains a phosphonic acid group and is bonded to a particle surface of the pigment is also referred to as "phosphonic acid type self-dispersible pigment". In addition, the self-dispersible pigment having a functional group that contains a sulfonic acid group and is bonded to a particle surface of the pigment is also referred to as "sulfonic acid type self-dispersible pigment". Further, the self-dispersible pigment having a functional group that contains a carboxylic acid group and is bonded to a particle surface of the pigment is also referred to as "carboxylic acid type self-dispersible pigment".

The present inventors presume the reason why adopting the constitution described above can provide an image having excellent uniformity even when the recording is conducted with plural inks in a short period of time to be as follows. The secondary color image is recorded by overlapping the first ink applied first and the second ink applied later with each other on a recording medium. The two inks are applied to the same region of the recording medium unlike a case where a primary color image is recorded. Thus, when the time difference between applications of the respective inks is short (for example, within 30 milliseconds), an ink droplet of the second ink is applied before completion of permeation of an ink droplet of the first ink applied first into the recording medium.

At this time, it is assumed that the coloring material of the first ink applied first is a phosphonic acid type self-dispersible pigment, and the coloring material of the second ink applied later is also a phosphonic acid type self-dispersible pigment. In this case, the phosphonic acid group contained in the functional group of the phosphonic acid type self-dispersible pigment in the first ink and a polyvalent metal such as calcium contained as a filler in the recording medium strongly interact with each other. Therefore, when the first ink is applied to the recording medium, the phosphonic acid type self-dispersible pigment rapidly aggregates, and liquid components of the first ink permeate into the recording medium. However, since the distribution of calcium in the recording medium is uneven, such a condition that a portion where the liquid components have permeated and a portion where the liquid components have not completely permeated are present is created. When the second ink is applied lately to the recording medium in such a condition, the portion where the liquid components have permeated and the portion where the liquid components have not completely permeated are different from each other in the degree of the interaction between the phosphonic acid group and the polyvalent metal, so that the degree of aggregation of the phosphonic acid type self-dispersible pigment also varies. As a result, it is considered that an image which causes unevenness and is low in uniformity is recorded.

It is then assumed that the coloring material of the first ink applied first is a phosphonic acid type self-dispersible pigment, and the coloring material of the second ink applied later is a sulfonic acid type self-dispersible pigment or a carboxylic acid type self-dispersible pigment. Even in this case, such a condition that a portion where the liquid components have permeated and a portion where the liquid components have not completely permeated are present is created when the first ink is applied to the recording medium. At a portion where the phosphonic acid type self-dispersible pigment has aggregated, it is presumed that the aggregated phosphonic acid type self-dispersible pigment acts as what is called "filler". When the second ink is applied lately to the recording medium being in such a state, the liquid components do not completely permeate at a position where the phosphonic acid type self-dispersible pigment does not aggregate, so that the permeation of a liquid components in the second ink applied lately becomes slow. In addition, even a portion where the phosphonic acid type self-dispersible pigment has aggregated, the phosphonic acid type self-dispersible pigment aggregated acts as "filler", so that the permeation of the liquid components in the second ink applied lately becomes slow. As a result, it is considered that the liquid components in the second ink evenly permeate, and so an image improved in uniformity is recorded.

Further, it is assumed that the coloring material of the first ink applied first is a sulfonic acid type self-dispersible pigment or a carboxylic acid type self-dispersible pigment, and the coloring material of the second ink applied later is a phosphonic acid type self-dispersible pigment. In this case, the sulfonic acid group or carboxylic acid group contained in the functional group of the self-dispersible pigment in the first ink does not interact with a polyvalent metal such as calcium so much. Therefore, the permeation of the liquid components precedes the aggregation of the self-dispersible pigment, so that the degree of aggregation of the self-dispersible pigment is different between a portion where the liquid components easily permeate and a portion where the liquid components hardly permeate. Such a condition that a portion where the liquid components have quickly permeated and a portion where the liquid components have not completely permeated are present is thereby created. When the second ink is applied lately to the recording medium in such a condition, the liquid components of the second ink also quickly permeate into the portion where the liquid components of the first ink have permeated. In addition, the second ink also migrates into the portion easy to permeate. As a result, it is considered that an image which causes unevenness and is low in uniformity is recorded.

Still further, it is assumed that the coloring material of the first ink applied first is a sulfonic acid type self-dispersible pigment or a carboxylic acid type self-dispersible pigment, and the coloring material of the second ink applied later is also a sulfonic acid type self-dispersible pigment or a carboxylic acid type self-dispersible pigment. Even in this case, permeation unevenness of the liquid components is caused by the influence of the self-dispersible pigment of the first ink applied first, so that the degree of permeation of the liquid components of the second ink applied lately also varies. As a result, it is considered that an image which causes unevenness and is low in uniformity is recorded.

Incidentally, when the time difference between applications of the first ink applied first and the second ink applied lately is to such a sufficient extent as exceeding 30 milliseconds, the liquid components of the first ink applied first sufficiently permeates into the recording medium. Therefore, an influence is not exerted on the permeation of the liquid components of the second ink applied lately. Accordingly, the uniformity of the secondary color image recorded becomes good irrespective of the application order of the respective inks.

Ink Jet Recording Method:

The ink jet recording method according to the present invention is an ink jet recording method of recording a secondary color image on a recording medium using a first ink and a second ink, said method having a step of overlappingly applying the first ink and the second ink in this order to the recording medium. The first ink contains a first self-dispersible pigment having a functional group that contains a phosphonic acid group and is bonded to a particle surface of the pigment, and the second ink contains a second self-dispersible pigment having a functional group that contains at least one acidic group of a sulfonic acid group and a carboxylic acid group and is bonded to a particle surface of the pigment. The time difference between applications of the first ink and the second ink to the recording medium is 30 milliseconds or less.

The hues of the first ink and the second ink may be the same or different from each other. In present invention, the feature that "the hues of the first ink and the second ink are the same" means that the first ink and the second ink are classified into the same hue within a range of hues classified into black, colors, and so on. On the other hand, the feature that "the hues of the first ink and the second ink are different" means that the first ink and the second ink are classified into different hues within the range of hues classified in the above-describe manner. Incidentally, the hues of colors include cyan, magenta, yellow, red, green and blue. In the present invention, the hues of the first ink and the second ink may be different from each other because a marked effect is achieved even under such a condition that the lowering of uniformity of a secondary color image is easily visually recognized. In addition, the hues of the first ink and the second ink may be any of the hues classified in the above-described manner. However, both the first ink and the second ink are favorably color inks because a marked effect is achieved even under such a condition that the lowering of uniformity of the secondary color image is easily visually recognized.

Ink:

Components constituting the first ink and second ink used in the ink jet recording method according to the present invention will now be described. Incidentally, the first ink and second ink are not required to cause a reaction or thickening when they come into contact with each other. That is, the respective inks are not required to contain a reacting agent or a thickener.

Coloring Material

The coloring material used in each ink is a self-dispersible pigment. As for kinds of a pigment making up the self-dispersible pigment, organic pigments such as azo, phthalocyanine, quinacridone, isoindolinone, imidazolone, diketopyrrolopyrrole and dioxazine pigments, and inorganic pigment such as carbon black may be mentioned.

First Self-dispersible Pigment

The first ink contains a first self-dispersible pigment. This first self-dispersible pigment is such that a functional group that contains a phosphonic acid group is bonded to a particle surface of the pigment. The functional group of the first self-dispersible pigment may contain another atomic group in addition to the phosphonic acid group. The phosphonic acid group —PO(O[$M_1$])$_2$ may be in any state of a partly dissociated state and an entirely dissociated state in the ink. That is, the phosphonic acid group may have any form of —PO$_3$H$_2$ (acid form), —PO$_3$H$^-$M$_1^+$ (monobasic salt) and —PO$_3^{2-}$(M$_1^+$)$_2$ (dibasic salt). Here, M$_1$'s are, independently of one another, at least one selected from the group consisting of a hydrogen atom, an alkali metal, ammonium and organic ammonium. Examples of the alkali metal represented by M$_1$ include lithium, sodium and potassium. Examples of the organic ammonium represented by M$_1$ include alkylamines having 1 to 3 carbon atoms, such as methylamine and ethylamine; and alkanolamines having 1 to 4 carbon atoms, such as monoethanolamine, diethanolamine and triethanolamine. In the present invention, the functional group bonded to the particle surface of the pigment favorably contains two phosphonic acid groups.

In addition, it is favorable that the phosphonic acid group is present at an end of the functional group bonded to the particle surface of the pigment, that is, another atomic group is present between the particle surface of the pigment and the phosphonic acid group. Examples of another atomic group (—R—) include a linear or branched alkylene group having 1 to 12 carbon atoms; an arylene group such as phenylene group or naphthylene group; an amide group; a sulfonyl group; an amino group; a carbonyl group; an ester group; and an ether group. In addition, groups in which these groups are combined with each other may also be mentioned. Further, said another atomic group favorably contains at least one of an alkylene group and an arylene group and a group having hydrogen bonding ability (for example, an amide group, sulfonyl group, amino group, carbonyl group, ester group or ether group). In the present invention, the functional group bonded to the particle surface of the pigment favorably contains a structure represented by —C$_6$H$_4$—CONH— (benzamide structure).

In the present invention, the functional group bonded to the particle surface of the pigment particularly favorably contains a structure represented by —CQ(PO$_3$[M$_1$]$_2$)$_2$. Q in the formula is any one of a hydrogen atom, R, OR, SR and NR$_2$. R's are, independently of one another, any one of a hydrogen atom, and alkyl, acyl, aralkyl and aryl groups. When R is a group containing carbon atoms, the number of carbon atoms contained in that group is favorably 1 or more and 18 or less. Specifically, there may be mentioned alkyl groups such as methyl and ethyl groups; acyl groups such as acetyl and benzoyl groups; aralkyl groups such as a benzyl group; and aryl groups such as phenyl and naphthyl groups. In addition, M$_1$'s are, independently of one another, at least one selected from the group consisting of a hydrogen atom, an alkali metal, ammonium and organic ammonium. In the present invention, a functional group containing a structure of —CH(PO$_3$[M$_1$]$_2$)$_2$ in which Q in the foregoing is a hydrogen atom is favorably bonded to the particle surface of the pigment.

The content (% by mass) of the first self-dispersible pigment in the first ink is favorably 0.1% by mass or more and 10.0% by mass or less, more favorably 1.0% by mass or more and 5.0% by mass or less based on the total mass of the ink. When the content of the first self-dispersible pigment is 1.0% by mass or more, the uniformity of an image recorded can be further enhanced. The introduced amount of the functional group of the first self-dispersible pigment is favorably $4.0 \times 10^{-2}$ mmol/g or more. When the introduced amount of the functional group of the first self-dispersible pigment is $4.0 \times 10^{-2}$ mmol/g or more, dispersion performance is improved, so that the storage stability of the resulting first ink is improved. In addition, the introduced amount of the functional group of the first self-dispersible pigment is favorably 1.00 (=$100.0 \times 10^{-2}$) mmol/g or less, more favorably 0.50 (=$50.0 \times 10^{-2}$) mmol/g or less.

"The introduced amount of the functional group" in the present specification indicates the number of millimoles of the functional group per gram of the pigment. The introduced amount of the functional group of the first self-dispersible pigment is measured by quantitatively determining the amount of phosphorus as described below. More specifically, a pigment dispersion liquid is first diluted with pure water in such a manner that the content of the pigment (solids) is about 0.03% by mass, thereby preparing Liquid A. The pigment dispersion liquid is then centrifuged under conditions of 5° C., 80,000 rpm and 15 hours to collect a supernatant liquid from which the pigment has been removed, and this liquid is diluted by about 80 times with pure water to prepare Liquid B. The thus-prepared Liquids A and B are subjected to quantitative phosphorus determination by, for example, an ICP Optical Emission Spectrometer. The amount of a phosphonic acid group is calculated from a difference in the amount of phosphorus between Liquids A and B which is found from the measured values as to Liquids A and B. The amount of the functional group introduced into the pigment can be calculated by (Amount of phosphonic acid group)/n (n denotes the number of phosphonic acid groups contained in one functional group; n is 1 (mono), 2 (bis) or 3 (tris)). If the number of phosphonic acid groups contained in the functional group is unknown, the number can be specified by analyzing the structure thereof by NMR. Incidentally, the dissociation constant of the phosphonic acid group is "1" in a pH range of an aqueous ink generally used. Quite naturally, the introduced amount of the functional group can also be measured by using a pigment extracted from an ink by a proper method.

The first ink may further contain another self-dispersible pigment than the first self-dispersible pigment (phosphonic acid type self-dispersible pigment). When another self-dispersible pigment is contained in the first ink, the content (% by mass) of the phosphonic acid type self-dispersible pigment is favorably 0.32 or more in terms of mass ratio with respect to the content (% by mass) of said another self-dispersible pigment (phosphonic acid type self-dispersible pigment/another self-dispersible pigment). When the mass ratio is 0.32 or more, the uniformity of an image recorded can be further enhanced because the phosphonic acid type self-dispersible pigment is to be present to some extent.

In addition, a self-dispersible pigment further having a functional group that contains another acidic group such as a carboxylic acid group or sulfonic acid group, an addition to the phosphonic acid group, and is bonded to the particle surface of the pigment may also be contained as the first self-dispersible pigment in the first ink. Incidentally, the introduced amount (mmol/g) of the phosphonic acid group is favorably 0.32 or more in terms of mass ratio with respect to the introduced amount (mmol/g) of said another acidic group (phosphonic acid group/another acidic group). When the mass ratio is 0.32 or more, the uniformity of an image recorded can be further enhanced because the phosphonic acid group is introduced to some extent.

Second Self-dispersible Pigment

The second ink contains a second self-dispersible pigment. This second self-dispersible pigment is such that a functional group that contains at least one acidic group of a sulfonic acid group and a carboxylic acid group is bonded to a particle surface of the pigment. The functional group of the second self-dispersible pigment may contain another atomic group in addition to at least one acidic group of the sulfonic acid group and the carboxylic acid group. Incidentally, in the second ink, the sulfonic type self-dispersible pigment and the carboxylic acid type self-dispersible pigment may also be used in combination. The sulfonic acid group —$SO_3M$ or the carboxylic acid group —COOM may be in any state of a partly dissociated state and an entirely dissociated state in the ink. That is, when an acidic group of a dissociable type is represented by —$X^-$, the acidic group may have any form of —XH (acid form) and —$X^-M_1^+$ (salt form). Here, $M_1$'s are, independently of one another, at least one selected from the group consisting of a hydrogen atom, an alkali metal, ammonium and organic ammonium. Examples of the alkali metal represented by $M_1$ include lithium, sodium and potassium. Examples of the organic ammonium represented by $M_1$ include alkylamines having 1 to 3 carbon atoms, such as methylamine and ethylamine; and alkanolamines having 1 to 4 carbon atoms, such as monoethanolamine, diethanolamine and triethanolamine.

In addition, it is favorable that the acidic group (sulfonic acid group or carboxylic acid group) is present at an end of the functional group bonded to the particle surface of the pigment, that is, another atomic group is present between the particle surface of the pigment and the acidic group. Examples of another atomic group (—R—) include a linear or branched alkylene group having 1 to 12 carbon atoms; an arylene group such as phenylene group or naphthylene group; an amide group; a sulfonyl group; an amino group; a carbonyl group; an ester group; and an ether group. In addition, said another atomic group favorably contains at least one of an alkylene group and an arylene group and a group having hydrogen bonding ability (for example, an amide group, sulfonyl group, amino group, carbonyl group, ester group or ether group). In the present invention, the functional group bonded to the particle surface of the pigment favorably contains a phenylene group. When the functional group bonded to the particle surface of the pigment contains a phenylene group, the effect of three-dimensionally cover the particle surface of the pigment is improved. Therefore, an exposed area of the particle surface of the pigment is lessened, and the dispersion stability of the second self-dispersible pigment in the second ink is improved to improve the storage stability of the second ink.

The content (% by mass) of the second self-dispersible pigment in the second ink is favorably 0.1% by mass or more and 10.0% by mass or less based on the total mass of the ink. The content is more favorably 1.0% by mass or more and 5.0% by mass or less. When the content of the second self-dispersible pigment is 1.0% by mass or more, the uniformity of an image recorded can be further enhanced. The introduced amount of the functional group of the second self-dispersible pigment is favorably $4.0 \times 10^{-2}$ mmol/g or more. When the introduced amount of the functional group of the second self-dispersible pigment is $4.0 \times 10^{-2}$ mmol/g or more, the amount of the acidic group per unit mass of the pigment increases, so that a water molecule can be retained in plenty as hydration water. Therefore, the dispersion stability of the second self-dispersible pigment in the second ink is improved to improve the storage stability of the second ink. In addition, the introduced amount of the functional group of the second self-dispersible pigment is favorably 1.00 ($=100.0 \times 10^{-2}$) mmol/g or less, more favorably 0.50 ($=50.0 \times 10^{-2}$) mmol/g or less.

"The introduced amount of the functional group" in the present specification indicates the number of millimoles of the functional group per gram of the pigment. The introduced amount of the functional group of the second self-dispersible pigment can be measured in a manner described below according to the kind of the acidic group. When the acidic group is a sulfonic acid group, the introduced amount of the functional group can be measured by quantitatively determining the amount of sulfur as described below. More specifically, a pigment dispersion liquid is first diluted with pure water in such a manner that the content of the pigment (solids) is about 0.03% by mass, thereby preparing Liquid A. The pigment dispersion liquid is then centrifuged under conditions of 5° C., 80,000 rpm and 15 hours to collect a supernatant liquid from which the pigment has been removed, and this liquid is diluted by about 80 times with pure water to prepare Liquid B. The thus-prepared Liquids A and B are subjected to quantitative sulfur determination by, for example, an ICP Optical Emission Spectrometer. The amount of a sulfonic acid group is calculated from a difference in the amount of sulfur between Liquids A and B which is found from the measured values as to Liquids A and B. The amount of the functional group introduced into the pigment can be calculated by (Amount of sulfonic acid group)/n (n denotes the number of sulfonic acid groups contained in one functional group; n is 1 (mono), 2 (bis) or 3 (tris)). If the number of sulfonic acid groups contained in the functional group is unknown, the number can be specified by analyzing the structure thereof by NMR. Incidentally, the dissociation constant of the sulfonic acid group is "1" in a pH range of an aqueous ink generally used.

When the acidic group is a carboxylic acid group, the quantitative determination for elements cannot be conducted by the ICP Optical Emission Spectrometer, so that the introduced amount of the functional group is measured by a colloidal titration method as described below. More specifically, the surface charge amount of the pigment in a pigment dispersion liquid is measured by colloidal titration using a potential difference, and this value is regarded as the amount of a carboxylic acid group. The amount of the functional group introduced into the pigment can be calculated by (Amount of carboxylic acid group)/n (n denotes the number of carboxylic acid groups contained in one functional group; n is 1 (mono), 2 (bis) or 3 (tris)). If the number of carboxylic acid groups contained in the functional group is unknown, the number can be specified by analyzing the structure thereof by NMR.

Aqueous Medium

An aqueous solvent that is water or a mixed solvent of water and water-soluble organic solvents may be caused to be contained in the respective inks. Deionized water or ion-exchanged water is favorably used as water. In the present invention, an aqueous ink containing at least water as an aqueous medium is particularly favorably prepared. The content (% by mass) of water in the ink is favorably 50.0% by mass or more and 95.0% by mass or less based on the total mass of the ink. The content (% by mass) of the water-soluble organic solvent in the ink is favorably 3.0% by mass or more and 50.0% by mass or less based on the total mass of the ink. Any of solvents usable in an ink jet ink, such as alcohols, (poly)alkylene glycols, glycol ethers and nitrogen-containing compounds may be used as the water-soluble organic solvent, and one or more thereof may be contained in the ink.

Other Components

The respective inks may also contain a water-soluble organic compound that is solid at ordinary temperature, such as urea or a derivative thereof, trimethylolpropane, or trimethylolethane, in addition to the above-described components. The content (% by mass) of these water-soluble organic compounds in the ink is favorably 0.1% by mass or more and 10.0% by mass or less based on the total mass of the ink. Further, various additives such as a resin, an anti-foaming agent, a surfactant, a pH adjustor, a preservative, a mildewproofing agents, an antioxidant and an anti-reducing agent may be caused to be contained in the inks, as needed, for providing an ink having desired physical properties.

When a resin is added to the respective inks, a water-soluble resin is favorably used. The reason for this is that if a resin particle having a particle size is used, it is difficult to control the permeability of an ink droplet unlike the water-soluble resin having no particle size. Quite naturally, a small amount of the resin particle may be used. In this case, however, the content (% by mass) of the resin particle in the ink is favorably 0.2 times or less in terms of mass ratio to the content of the self-dispersible pigments. Further, the content (% by mass) of the resin particle in the ink is favorably less than 0.1% by mass based on the total mass of the ink, and it is more favorable that the ink does not contain the resin particle. On the other hand, the water-soluble resin scarcely exerts an influence on the permeability of the ink droplet. A water-soluble resin such as a (meth)acrylic resin or a urethane resin is favorable as the water-soluble resin, and a (meth)acrylic resin is particularly favorable. The (meth) acrylic resin is favorably that having an acid value of 80 mg KOH/g or more and 200 mg KOH/g or less. When the water-soluble resin is used, the content (% by mass) of the water-soluble resin in the ink is favorably 0.1% by mass or more and 2.0% by mass or less based on the total mass of the ink. Incidentally, in the present invention, a resin which does not form a particle whose particle size can be measured when it is neutralized with an alkali equivalent to the acid value thereof, and a resin which forms a particle whose particle size can be measured are defined as "a water-soluble resin" and "a resin particle", respectively.

Physical Properties of Ink

The viscosities of the respective inks at 25° C. are favorably 2.0 mPa·s or more and 5.0 mPa·s or less, more favorably 2.0 mPa·s or more and 4.0 mPa·s or less. The pH's of the respective inks at 25° C. are favorably 5.0 or more and 9.5 or less, more favorably 7.0 or more and 9.0 or less. The static surface tensions of the respective inks at 25° C. are favorably 25.0 mN/m or more and 45.0 mN/m or less, more favorably 30.0 mN/m or more and 40.0 mN/m or less.

EXAMPLES

The present invention will hereinafter be described more specifically by the following Examples and Comparative Examples. However, the present invention is not limited to the following examples unless going beyond the gist of the present invention. Incidentally, all designations of "part" or "parts" and "%" as to amounts of components described below are based on mass unless expressly noted.

Preparation of Pigment Dispersion Liquid:

Introduced amount of functional group of self-dispersible pigment

A method for measuring the introduced amount of a functional group of a self-dispersible pigment is first described. The introduced amount of a functional group of a self-dispersible pigment whose acidic group is a sulfonic acid group or a phosphonic acid group was measured in the following manner. A pigment dispersion liquid was diluted with pure water in such a manner that the content of a pigment that is an object of measurement is about 0.03%, thereby preparing Liquid A. The pigment dispersion liquid was then centrifuged under conditions of 5° C., 80,000 rpm and 15 hours to collect a supernatant liquid from which the self-dispersible pigment had been removed, and this liquid was diluted by about 80 times with pure water to prepare Liquid B. The thus-prepared Liquids A and B which are samples for measurement were subjected to quantitative determination for elements (sulfur or phosphorus) by means of an ICP Optical Emission Spectrometer (trade name "SPS5100", manufactured by SII Nanotechnology Inc.). The amount of an acidic group was found from a difference in the amount of the element between Liquids A and B, and the amount of the acidic group was divided by the number of acidic groups contained in one functional group to calculate the introduced amount of the functional group.

The introduced amount of a functional group of a self-dispersible pigment whose acidic group is a carboxylic acid group was measured by colloidal titration in the following manner. A pigment dispersion liquid was subjected to potentiometric titration using an automatic potentiometric titrator (trade name "AT-510", manufactured by KYOTO ELECTRONICS MANUFACTURING CO., LTD.) in which a streaming potential detection unit (PCD-500) was installed and using methyl glycol chitosan as a titrant, thereby measuring the amount of an acidic group. The amount of the acidic group was divided by the number of acidic groups contained in one functional group to calculate the introduced amount of the functional group.

Twenty grams of a pigment of the kind shown in Table 1, a treating agent of the kind and amount shown in Table 1, nitric acid equimolar to the treating agent and 200 mL of pure water were stirred for 30 minutes under conditions of room temperature and 6,000 rpm by means of a Silverson mixer to obtain a mixture. Incidentally, among treating agents shown in Table 1, "Phosphonic acid", "Carboxylic acid" and "Sulfonic acid" are ((4-aminobenzoyl-amino)-methane-1,1-diyl)bisphosphonic acid, p-aminophthalic acid and p-aminobenzenesulfonic acid, respectively. Potassium nitrite (equimolar to the treating agent) dissolved in a small amount of water was slowly added to and mixed with the resultant mixture. The temperature of the mixture reached 60° C. by the mixing of potassium nitrite. Under this state, a reaction was conducted for 1 hour. Thereafter, the pH of the mixture was adjusted to 10 with an aqueous solution of potassium hydroxide. After 30 minutes, 20 mL of pure water was added, and diafiltration was conducted with a Spectrum membrane to obtain a self-dispersible pigment. Water was added to the resultant self-dispersible pigment to obtain respective pigment dispersion liquids in which the content of the pigment was 10.0%.

Preparation of Ink:

After the components (unit: %) shown in the upper part of Tables 2-1 and 2-2 were mixed and sufficiently stirred, the resultant mixtures were filtered under pressure through a polypropylene filter (product of Pall Corporation) having a pore size of 2.5 μm to prepare respective inks. The content (%) of a pigment in the inks is shown in the lower part of Tables 2-1 and 2-2. Incidentally, "Acetylenol E100" in Tables 2-1 and 2-2 is a trade name of a nonionic surfactant (ethylene oxide adduct of acetylene glycol) produced by Kawaken Fine Chemicals Co., Ltd. The result of evaluation of storage stability of each ink which was performed according to a method described below is shown in the bottom of Tables 2-1 and 2-2.

Storage Stability of Ink:

The viscosity of each ink was first measured. After each ink was then placed in a polytetrafluoroethylene container and left at rest for one month in a thermostatic chamber controlled to 60° C. in a sealed state, the temperature was returned to ordinary temperature to measure a viscosity of each ink. The viscosity of the ink was measured under conditions of 25° C. and 50 rpm by means of an E-type viscometer (trade name "RE-80L", manufactured by TOKI Sangyo Co., Ltd.). The increase rate of the viscosity was determined from the viscosities of the ink before and after storage to evaluate the ink as to storage stability according to the following evaluation criteria. The result is shown in Tables 2-1 and 2-2.

OK: Increase rate of the viscosity was less than 10%;

NG: Increase rate of the viscosity was 10% or more.

TABLE 1

Preparation conditions and properties of self-dispersible pigment

| | | Treating agent [mmol] | | | Introduced amount of functional group [mmol/g] | | |
| --- | --- | --- | --- | --- | --- | --- | --- |
| | Kind of pigment | Phosphonic acid | Carboxylic acid | Sulfonic acid | Derived from phosphonic acid | Derived from carboxylic acid | Derived from sulfonic acid |
| Cyan pigment dispersion 1 | C.I. Pigment Blue 15:4 | 4.0 | | | $10.0 \times 10^{-2}$ | | |
| Cyan pigment dispersion 2 | C.I. Pigment Blue 15:4 | 1.6 | | | $4.0 \times 10^{-2}$ | | |
| Cyan pigment dispersion 3 | C.I. Pigment Blue 15:4 | 1.2 | | | $3.0 \times 10^{-2}$ | | |
| Cyan pigment dispersion 4 | C.I. Pigment Blue 15:4 | | | 4.0 | | | $10.0 \times 10^{-2}$ |
| Cyan pigment dispersion 5 | C.I. Pigment Blue 15:4 | | 4.0 | | | $10.0 \times 10^{-2}$ | |
| Magenta pigment dispersion 1 | C.I. Pigment Red 122 | | | 10.0 | | | $10.0 \times 10^{-2}$ |
| Magenta pigment dispersion 2 | C.I. Pigment Red 122 | | | 4.0 | | | $4.0 \times 10^{-2}$ |
| Magenta pigment dispersion 3 | C.I. Pigment Red 122 | | | 3.0 | | | $3.0 \times 10^{-2}$ |
| Magenta pigment dispersion 4 | C.I. Pigment Red 122 | 10.0 | | | $10.0 \times 10^{-2}$ | | |
| Magenta pigment dispersion 5 | C.I. Pigment Red 122 | | 10.0 | | | $10.0 \times 10^{-2}$ | |
| Yellow pigment dispersion 1 | C.I. Pigment Yellow 74 | 20.0 | | | $10.0 \times 10^{-2}$ | | |
| Yellow pigment dispersion 2 | C.I. Pigment Yellow 74 | | | 20.0 | | | $10.0 \times 10^{-2}$ |
| Black pigment dispersion 1 | Carbon black | 6.7 | | | $30.0 \times 10^{-2}$ | | |
| Black pigment dispersion 2 | Carbon black | | | 6.7 | | | $30.0 \times 10^{-2}$ |

TABLE 2-1

Composition and properties of ink

| | Ink | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Cyan pigment dispersion 1 | 40.0 | 10.0 | 9.0 | | | | | | 20.0 | | | |
| Cyan pigment dispersion 2 | | | | 40.0 | | | | | | | | |
| Cyan pigment dispersion 3 | | | | | 40.0 | | | | | | | |
| Cyan pigment dispersion 4 | | | | | | 40.0 | 10.0 | 9.0 | 20.0 | | | |
| Cyan pigment dispersion 5 | | | | | | | | | | 40.0 | | |
| Magenta pigment dispersion 1 | | | | | | | | | | | 40.0 | 10.0 |
| Magenta pigment dispersion 2 | | | | | | | | | | | | |
| Magenta pigment dispersion 3 | | | | | | | | | | | | |
| Magenta pigment dispersion 4 | | | | | | | | | | | | |
| Magenta pigment dispersion 5 | | | | | | | | | | | | |
| Yellow pigment dispersion 1 | | | | | | | | | | | | |
| Yellow pigment dispersion 2 | | | | | | | | | | | | |
| Black pigment dispersion 1 | | | | | | | | | | | | |
| Black pigment dispersion 2 | | | | | | | | | | | | |
| Glycerol | 10.0 | 10.0 | 10.0 | 10.0 | 10.0 | 10.0 | 10.0 | 10.0 | 10.0 | 10.0 | 10.0 | 10.0 |
| 2-Pyrrolidone | 5.0 | 5.0 | 5.0 | 5.0 | 5.0 | 5.0 | 5.0 | 5.0 | 5.0 | 5.0 | 5.0 | 5.0 |
| Triethylene glycol | 5.0 | 5.0 | 5.0 | 5.0 | 5.0 | 5.0 | 5.0 | 5.0 | 5.0 | 5.0 | 5.0 | 5.0 |
| Acetylenol E100 | 0.5 | 0.5 | 0.5 | 0.5 | 0.5 | 0.5 | 0.5 | 0.5 | 0.5 | 0.5 | 0.5 | 0.5 |
| Pure water | 39.5 | 69.5 | 70.5 | 39.5 | 39.5 | 39.5 | 69.5 | 70.5 | 39.5 | 39.5 | 39.5 | 69.5 |
| Content of pigment (%) | 4.0 | 1.0 | 0.9 | 4.0 | 4.0 | 4.0 | 1.0 | 0.9 | 4.0 | 4.0 | 4.0 | 1.0 |
| Storage stability | OK | OK | OK | OK | NG | OK | OK | OK | OK | OK | OK | OK |

TABLE 2-2

Composition and properties of ink

| | Ink | | | | | | | | | | |
|---|---|---|---|---|---|---|---|---|---|---|---|
| | 13 | 14 | 15 | 16 | 17 | 18 | 19 | 20 | 21 | 22 | 23 |
| Cyan pigment dispersion 1 | | | | | | | | | | | |
| Cyan pigment dispersion 2 | | | | | | | | | | | |
| Cyan pigment dispersion 3 | | | | | | | | | | | |
| Cyan pigment dispersion 4 | | | | | | | | | | | |
| Cyan pigment dispersion 5 | | | | | | | | | | | |
| Magenta pigment dispersion 1 | 9.0 | | | | | | | | | | |
| Magenta pigment dispersion 2 | | 40.0 | | | | | | | | | |
| Magenta pigment dispersion 3 | | | 40.0 | | | | | | | | |
| Magenta pigment dispersion 4 | | | | 40.0 | 10.0 | 9.0 | | | | | |
| Magenta pigment dispersion 5 | | | | | | | 40.0 | | | | |
| Yellow pigment dispersion 1 | | | | | | | | 40.0 | | | |
| Yellow pigment dispersion 2 | | | | | | | | | 40.0 | | |
| Black pigment dispersion 1 | | | | | | | | | | 40.0 | |

TABLE 2-2-continued

Composition and properties of ink

| | Ink | | | | | | | | | | |
|---|---|---|---|---|---|---|---|---|---|---|---|
| | 13 | 14 | 15 | 16 | 17 | 18 | 19 | 20 | 21 | 22 | 23 |
| Black pigment dispersion 2 | | | | | | | | | | | 40.0 |
| Glycerol | 10.0 | 10.0 | 10.0 | 10.0 | 10.0 | 10.0 | 10.0 | 10.0 | 10.0 | 10.0 | 10.0 |
| 2-Pyrrolidone | 5.0 | 5.0 | 5.0 | 5.0 | 5.0 | 5.0 | 5.0 | 5.0 | 5.0 | 5.0 | 5.0 |
| Triethylene glycol | 5.0 | 5.0 | 5.0 | 5.0 | 5.0 | 5.0 | 5.0 | 5.0 | 5.0 | 5.0 | 5.0 |
| Acetylenol E100 | 0.5 | 0.5 | 0.5 | 0.5 | 0.5 | 0.5 | 0.5 | 0.5 | 0.5 | 0.5 | 0.5 |
| Pure water | 70.5 | 39.5 | 39.5 | 39.5 | 69.5 | 70.5 | 39.5 | 39.5 | 39.5 | 39.5 | 39.5 |
| Content of pigment (%) | 0.9 | 4.0 | 4.0 | 4.0 | 1.0 | 0.9 | 4.0 | 4.0 | 4.0 | 4.0 | 4.0 |
| Storage stability | OK | OK | NG | OK | OK | OK | OK | OK | OK | OK | OK |

Evaluation:
Uniformity of Image

Each of the respective inks shown on the left of Tables 3-1 and 3-2 was filled into an ink cartridge, and the ink cartridge was set in a modified apparatus of an ink jet recording apparatus (trade name "PIXUS Pro 9500", manufactured by Canon Inc.) in which a recording head from which an ink is ejected by thermal energy had been installed. Incidentally, in the above-described ink jet recording apparatus, the condition where one ink droplet whose mass is 3.5 ng is applied to a unit region of 1/1,200 inch×1/1,200 inch is defined as "recording duty being 100%".

As recording media PB Paper, Canon Plain Paper White SW-101, High-Grade Exclusive Paper HR-101 and Matte Photo Paper MP-101 (all, trade names, products of Canon Inc.); and HP Bright White Ink Jet Paper (trade name, product of Hewlett Packard Co.) were used. The following image was recorded on these recording media. At this time, the apparatus was set in such a manner that the respective inks are overlappingly applied to the recording medium at a predetermined time difference shown in Tables 3-1 and 3-2 by one-pass one-way recording such that an ink applied first to the recording medium and an ink applied later were a first ink and a second ink, respectively.

Primary color solid images (2 cm×2 cm) of 10 gradations in total in which the recording duty was changed from 10% to 100% with an increment of 10% were then recorded by using the first ink and the second ink singly to obtain recorded articles. In addition, secondary color solid images (2 cm×2 cm) of 10 gradations in total in which the recording duties of the first ink and the second ink were changed from 10% to 100% with an increment of 10% to vary the total recording duties from 20% to 200% were recorded as secondary color images to obtain recorded articles. After the resultant recorded articles are air-dried for one day, the uniformity of the respective solid images was visually observed to rank them according to the following evaluation criteria, thereby determining the average of the points of the five recording media. Evaluation results of uniformity are shown as points on the right of Tables 3-1 and 3-2. A higher point indicates that the uniformity is excellent.

2.0 points: The uniformity of the secondary color image was alike compared with the corresponding two primary color images;

1.0 point: The uniformity of the secondary color image was somewhat inferior compared with the corresponding two primary color images;

0.0 point: The uniformity of the secondary color image was clearly inferior compared with the corresponding two primary color images.

TABLE 3-1

Evaluation conditions and results

| | | No. of first ink | No. of second ink | Time difference [ms] | Evaluation result of uniformity [points] |
|---|---|---|---|---|---|
| Example | 1 | 1 | 11 | 4.2 | 2.0 |
| | 2 | 1 | 19 | 4.2 | 2.0 |
| | 3 | 9 | 11 | 4.2 | 2.0 |
| | 4 | 1 | 21 | 4.2 | 2.0 |
| | 5 | 1 | 23 | 4.2 | 2.0 |
| | 6 | 16 | 6 | 4.2 | 2.0 |
| | 7 | 16 | 21 | 4.2 | 2.0 |
| | 8 | 16 | 23 | 4.2 | 2.0 |
| | 9 | 20 | 6 | 4.2 | 2.0 |
| | 10 | 20 | 11 | 4.2 | 2.0 |
| | 11 | 20 | 23 | 4.2 | 2.0 |
| | 12 | 22 | 6 | 4.2 | 2.0 |
| | 13 | 22 | 11 | 4.2 | 2.0 |
| | 14 | 22 | 21 | 4.2 | 2.0 |
| | 15 | 2 | 12 | 4.2 | 2.0 |
| | 16 | 4 | 14 | 4.2 | 2.0 |
| | 17 | 3 | 13 | 4.2 | 2.0 |
| | 18 | 5 | 15 | 4.2 | 2.0 |
| | 19 | 1 | 11 | 30 | 2.0 |

TABLE 3-2

Evaluation conditions and results

| | | No. of first ink | No. of second ink | Time difference [ms] | Evaluation result of uniformity [points] |
|---|---|---|---|---|---|
| Comparative Example | 1 | 1 | 16 | 4.2 | 0.0 |
| | 2 | 1 | 20 | 4.2 | 0.0 |
| | 3 | 1 | 22 | 4.2 | 0.0 |
| | 4 | 16 | 1 | 4.2 | 0.0 |
| | 5 | 16 | 20 | 4.2 | 0.0 |
| | 6 | 16 | 22 | 4.2 | 0.0 |
| | 7 | 20 | 1 | 4.2 | 0.0 |
| | 8 | 20 | 16 | 4.2 | 0.0 |
| | 9 | 20 | 22 | 4.2 | 0.0 |
| | 10 | 22 | 1 | 4.2 | 0.0 |
| | 11 | 22 | 16 | 4.2 | 0.0 |
| | 12 | 22 | 20 | 4.2 | 0.0 |
| | 13 | 6 | 11 | 4.2 | 0.2 |
| | 14 | 6 | 21 | 4.2 | 0.2 |
| | 15 | 6 | 23 | 4.2 | 0.2 |
| | 16 | 11 | 6 | 4.2 | 0.2 |
| | 17 | 11 | 21 | 4.2 | 0.2 |
| | 18 | 11 | 23 | 4.2 | 0.2 |
| | 19 | 21 | 6 | 4.2 | 0.2 |
| | 20 | 21 | 11 | 4.2 | 0.2 |

TABLE 3-2-continued

Evaluation conditions and results

|  | No. of first ink | No. of second ink | Time difference [ms] | Evaluation result of uniformity [points] |
|---|---|---|---|---|
|  | 21 | 21 | 23 | 4.2 | 0.2 |
|  | 22 | 23 | 6 | 4.2 | 0.2 |
|  | 23 | 23 | 11 | 4.2 | 0.2 |
|  | 24 | 23 | 21 | 4.2 | 0.2 |
|  | 25 | 6 | 16 | 4.2 | 0.0 |
|  | 26 | 6 | 20 | 4.2 | 0.0 |
|  | 27 | 6 | 22 | 4.2 | 0.0 |
|  | 28 | 11 | 1 | 4.2 | 0.0 |
|  | 29 | 11 | 20 | 4.2 | 0.0 |
|  | 30 | 11 | 22 | 4.2 | 0.0 |
|  | 31 | 21 | 1 | 4.2 | 0.0 |
|  | 32 | 21 | 16 | 4.2 | 0.0 |
|  | 33 | 21 | 22 | 4.2 | 0.0 |
|  | 34 | 23 | 1 | 4.2 | 0.0 |
|  | 35 | 23 | 16 | 4.2 | 0.0 |
|  | 36 | 23 | 20 | 4.2 | 0.0 |
|  | 37 | 10 | 16 | 4.2 | 0.0 |
|  | 38 | 3 | 18 | 4.2 | 0.6 |
|  | 39 | 7 | 17 | 4.2 | 0.0 |
|  | 40 | 8 | 18 | 4.2 | 0.6 |
| Referential Example | 1 | 16 | 23 | 35 | 2.0 |
|  | 2 | 20 | 11 | 35 | 2.0 |

When a difference in point between Example 15 and Comparative Example 39 and a difference in point between Example 17 and Comparative Example 40 are compared with each other, the latter difference in point is smaller. It is understood from this that when the content of the pigment in the ink is 1.0% or more, a higher effect is achieved. When the storage stability between respective inks used in Examples 16 and 18 are compared with each other, inks used in Example 16 had relatively better storage stability.

Example 20

A resin aqueous solution was prepared which contained a product obtained by neutralizing a styrene-butyl acrylate-acrylic acid terpolymer (water-soluble resin) having an acid value of 120 mgKOH/g and a weight-average molecular weight of 8,000 with potassium hydroxide in an amount equivalent to the acid value and had a resin (solid) content of 10.0%. Two inks were prepared by compounding the components in the same manner as the two inks used in Example 1 (Inks 1 and 11) except that the prepared resin aqueous solution was added in an amount of 10.0%, and that the pure water of the same amount of the added resin aqueous solution was excluded. Using the thus prepared two inks, the same evaluations as above were conducted (Example 20). As a result, the images recorded in Example 20 had as good performance as that of the images recorded in Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272240, filed Dec. 27, 2013, which is hereby incorporated by reference herein in its entirety.

What is claimed is:

1. An ink jet recording method comprising:
   recording a secondary color image on a recording medium using a first ink and a second ink, wherein the first ink contains a first self-dispersible pigment having a phosphonic acid group directly bonded to the particle surface of the first self-dispersible pigment or a phosphonic acid group bonded to the particle surface of the first self-dispersible pigment via an another atomic group, and wherein the second ink includes a second self-dispersible pigment having (a) a sulfonic acid group and /or a carboxylic acid group directly bonded to the particle surface of the second self-dispersible pigment, or (b) a sulfonic acid group and/or a carboxylic acid group bonded to the particle surface of the second self-dispersible pigment via an another atomic group; and
   overlappingly applying the first ink and the second ink in this order to the recording medium,
   wherein a time difference between the applications of the first ink and the second ink to the recording medium is 30 milliseconds or less.

2. The ink jet recording method according to claim 1, wherein a content of the first self-dispersible pigment in the first ink is 1.0% by mass or more based on the total mass of the first ink.

3. The ink jet recording method according to claim 1, wherein a content of the second self-dispersible pigment in the second ink is 1.0% by mass or more based on the total mass of the second ink.

4. The ink jet recording method according to claim 1, wherein an introduced amount of a functional group comprising the phosphonic acid group of the first self-dispersible pigment is $4.0 \times 10^{-2}$ mmol/g or more.

5. The ink jet recording method according to claim 1, wherein an introduced amount of a functional group comprising the sulfonic acid group and/or the carboxylic acid group of the second self-dispersible pigment is $4.0 \times 10^{-2}$ mmol/g or more.

6. The ink jet recording method according to claim 1, wherein hues of the first ink and the second ink are different from each other.

7. The ink jet recording method according to claim 1, wherein the first ink and the second ink are both color inks.

8. The ink jet recording method according to claim 1, wherein the content of the first self-dispersible pigment in the first ink is 4.0% by mass or less based on the total mass of the first ink.

9. The ink jet recording method according to claim 1, wherein the content of the second self-dispersible pigment in the second ink is 4.0% by mass or less based on the total mass of the second ink.

10. The ink jet recording method according to claim 1, wherein an introduced amount of a functional group comprising the phosphonic acid group of the first self-dispersible pigment is $30.0 \times 10^{-2}$ mmol/g or less.

11. The ink jet recording method according to claim 1, wherein an introduced amount of a functional group comprising the sulfonic acid group and/or the carboxylic acid group of the second self-dispersible pigment is $30.0 \times 10^{-2}$ mmol/g or less.

12. The ink jet recording method according to claim 1, wherein the first self-dispersible pigment comprises at least one of an organic pigment and an inorganic pigment.

13. The ink jet recording method according to claim 1, wherein the second self-dispersible pigment comprises at least one of an organic pigment and an inorganic pigment.

14. The ink jet recording method according to claim 1, wherein the first self-dispersible pigment is at least one selected from the group consisting of azo pigment, phthalocyanine pigment, quinacridone pigment, isoindolinone pigment, imidazolone pigment, diketopyrrolopyrrole pigment, dioxazine pigment, and carbon black.

15. The ink jet recording method according to claim 1, wherein the second self-dispersible pigment is at least one selected from the group consisting of azo pigment, phthalocyanine pigment, quinacridone pigment, isoindolinone pigment, imidazolone pigment, diketopyrrolopyrrole pigment, dioxazine pigment, and carbon black.

* * * * *